(12) United States Patent
Stovall, Jr.

(10) Patent No.: US 6,588,145 B1
(45) Date of Patent: Jul. 8, 2003

(54) METHOD AND APPARATUS FOR INHIBITING GRASS FROM OVERGROWING PAVEMENT AND FENCES

(76) Inventor: Edward Stovall, Jr., 6515 Forest Rd., Columbus, GA (US) 31907

( * ) Notice: Subject to any disclaimer, the term of this patent is extended or adjusted under 35 U.S.C. 154(b) by 0 days.

(21) Appl. No.: 09/597,683

(22) Filed: Jun. 21, 2000

(51) Int. Cl.[7] ............................................... A01G 1/08
(52) U.S. Cl. ......................................................... 47/33
(58) Field of Search .............................. 47/33; 52/102; 404/6–8

(56) References Cited

U.S. PATENT DOCUMENTS

| | | | | |
|---|---|---|---|---|
| 76,614 A | * | 4/1868 | Faurot et al. ................... 404/2 |
| 442,060 A | * | 12/1890 | Landis ........................... 404/2 |
| 456,995 A | * | 8/1891 | Landis ........................... 404/7 |
| 457,886 A | * | 8/1891 | Landis ........................... 404/7 |
| 537,047 A | * | 4/1895 | Landis ........................... 404/8 |
| 1,034,504 A | * | 8/1912 | Pindell .......................... 238/9 |
| 1,139,515 A | * | 5/1915 | Haas ........................... 52/102 |
| 1,529,329 A | * | 3/1925 | Turnbo .......................... 404/7 |
| 1,978,491 A | * | 10/1934 | Gladman ....................... 404/2 |
| 2,319,345 A | * | 5/1943 | Putnam ........................ 52/254 |
| 3,314,193 A | | 4/1967 | Chancellor ..................... 47/33 |
| 3,393,897 A | | 7/1968 | Wright ......................... 256/32 |
| 3,520,082 A | | 7/1970 | Smith ............................ 47/33 |
| 3,758,999 A | * | 9/1973 | Matvey ........................ 52/103 |
| 3,777,421 A | | 12/1973 | Bomba et al. .................. 47/33 |
| 3,885,364 A | * | 5/1975 | Lankheet ..................... 52/169.7 |
| 3,916,563 A | | 11/1975 | Tedesh ........................... 47/33 |
| 4,222,197 A | | 9/1980 | Johnson ......................... 47/33 |
| 4,349,989 A | | 9/1982 | Snider, Jr. ..................... 47/33 |
| 4,381,622 A | | 5/1983 | Spidell .......................... 47/33 |
| 4,897,973 A | | 2/1990 | Foster, Jr. et al. ............ 52/102 |
| 4,964,619 A | | 10/1990 | Glidden, Jr. ................. 256/32 |
| 5,157,867 A | | 10/1992 | Fritch ........................... 47/33 |
| D352,643 S | | 11/1994 | Hoculik ......................... D8/1 |
| 5,421,118 A | | 6/1995 | Bauer ............................ 47/33 |
| 5,531,044 A | | 7/1996 | Wallenius ...................... 47/33 |
| 5,857,288 A | | 1/1999 | Wiste ............................ 47/33 |
| 6,099,201 A | * | 8/2000 | Abbrancati ..................... 404/7 |

OTHER PUBLICATIONS

American Plastic Council, "History of Plastics", http://www.americanplasticscouncil.org/benefits/about_plastics/history.html.*

* cited by examiner

Primary Examiner—Peter M. Poon
Assistant Examiner—Son T. Nguyen
(74) Attorney, Agent, or Firm—Baker, Donelson, Bearman & Caldwell

(57) ABSTRACT

An apparatus for inhibiting grass from overgrowing the side edge of pavement comprises a length of concrete laid along the side of the pavement with a top surface that extends coplanar from the pavement and then sloped down and away from the pavement. The length of concrete is overlaid with a strip of plastic and held thereto with anchor bolts that are anchored in the length of concrete prior to its being dried and hardened.

10 Claims, 2 Drawing Sheets

METHOD AND APPARATUS FOR INHIBITING GRASS FROM OVERGROWING PAVEMENT AND FENCES

TECHNICAL FIELD

This invention relates generally to outdoor pavements such as sidewalks, parking lots and roads that are bordered with vegetation such as grass.

BACKGROUND OF THE INVENTION

Outdoor pavements such as concrete sidewalks are commonly bordered with vegetation, usually grass. The grass blades usually overhang {stolons} the side edges of the pavement. Sometimes the grass even overgrows and encroaches upon the pavement sides. Such presents an unkempt appearance. To maintain a neat appearance these pavements are periodically edged with powered edgers that trim away the overgrown grass. In other cases shallow trenches are periodically formed along their borders. In still other cases upright metal bands are implanted to serve as grass barriers. In yet other situations vegetation killing chemicals are periodically sprayed along the pavement borders.

The just described outdoor maintenance techniques and devices, though effective, nevertheless have certain problems. Principally among these problems is the cost of maintenance. Grass trimming and edging is a never ending task with its recurring labor costs. The devices such as metal and plastic edgers are costly to install. Moreover, they often are damaged by mowers in which case they must not only have to be replaced but can damage the grass mowers and even their operators.

Accordingly it is seen that were a method and apparatus to be devised that would be effective in inhibiting grass from overgrowing the side edges of pavements in a more cost effective manner, a distinct advance would be achieved. It is to the provision of such that the present invention is primarily directed.

SUMMARY OF THE INVENTION

In a preferred form of the invention a method is provided for forming and installing apparatus for inhibiting grass from overgrowing the side edge of pavement. The method comprises the steps of digging a trench along the pavement side edge and at least partially filling the trench with a concrete slurry, preferably after a reinforced concrete with cardboard forms foundation is first constructed on the floor of the trench. The concrete slurry is shaped to have a top surface that slopes or steps down and away from the top surface of the pavement. The slurry is then overlaid with a plastic strip having an array of holes. The plastic strip is secured to the concrete slurry with anchor bolts that are passed through the strip holes and into the concrete slurry. The concrete slurry is then allowed to dry and harden underneath the plastic strip.

In another form of the invention apparatus for inhibiting grass from overgrowing the side edge of pavement comprises a length of concrete laid alongside the pavement that has a top surface at least of a portion of which slopes downwardly away from the pavement. A strip of plastic one to three centimeters thick overlays the length of concrete. Fastening means are provided for fastening the strip of plastic to the length of concrete. Once formed in situ adjacent the pavement, grass is separated from the sidewalk to render a permanent appearance of neatness.

DETAILED DESCRIPTION

Figure 1:
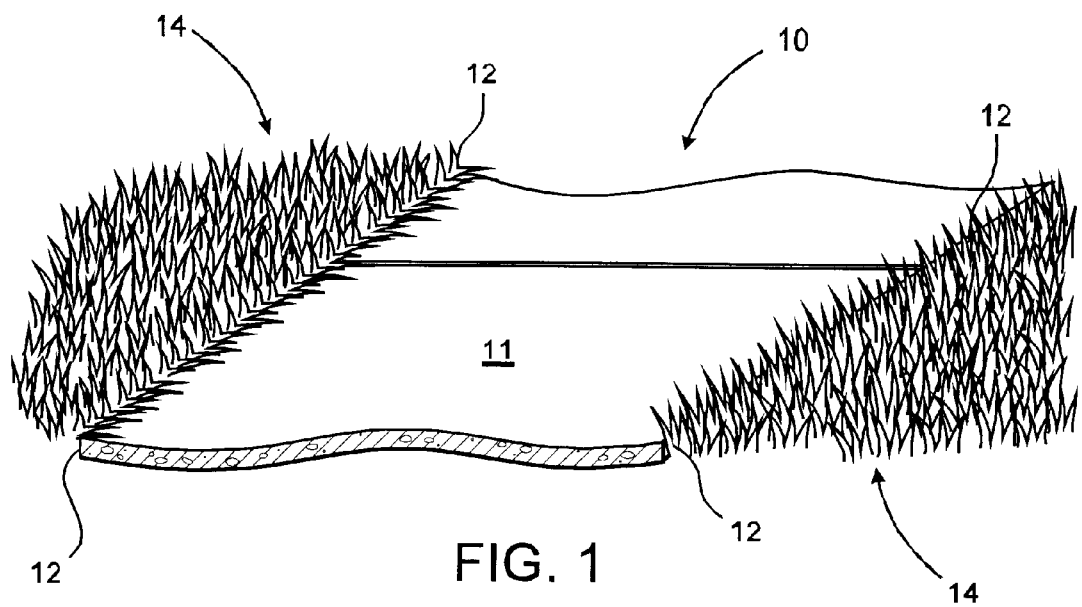
FIG. 1 is an illustration of a sidewalk with grass shown overgrowing its side edges.
Figure 3:
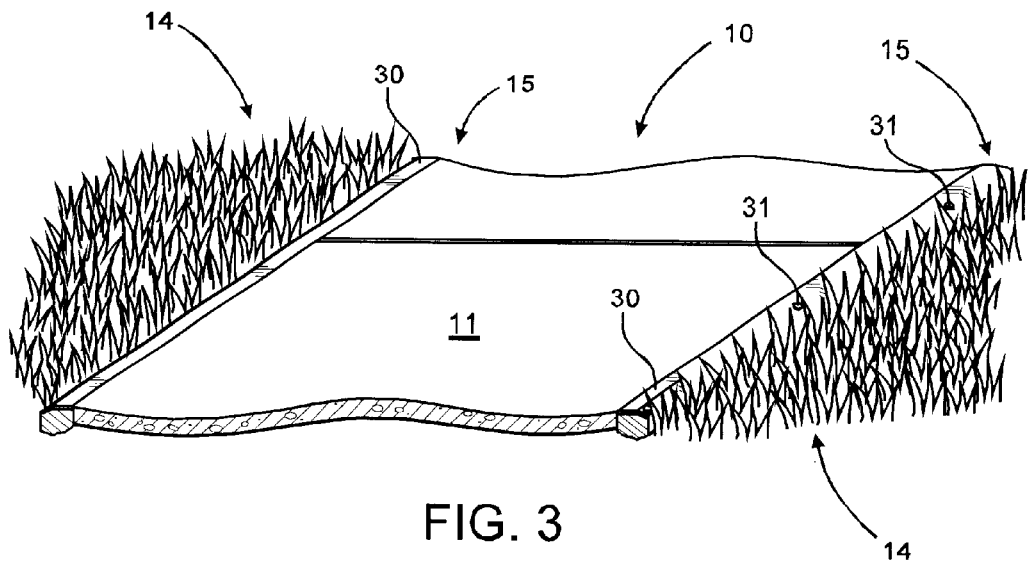
FIG. 3 is an illustration of the sidewalk of, FIG. 1 following the formation and installation of the apparatus.

With reference next in more detail to the drawings, there is shown in FIG. 1 a sidewalk 10 conventionally formed in situ of a four-inch thick concrete pavement or slab having a flat top surface 11 and side edges 12. Both side edges 12 are seen to be overgrown with grass of a grass field 14. This presents an unkempt appearance which is often corrected as by periodically trimming the grass or trenching the sod that borders the sidewalk. With the present invention however the sidewalk 10 is permanently rendered neat in appearance as shown in FIG. 3 with its side edges free of encroachment by grass from the grass field 14. This is accomplished by the formation and installation of the two apparatuses 15 shown bordering the opposite side edges of the sidewalk 10.

Figure 2:
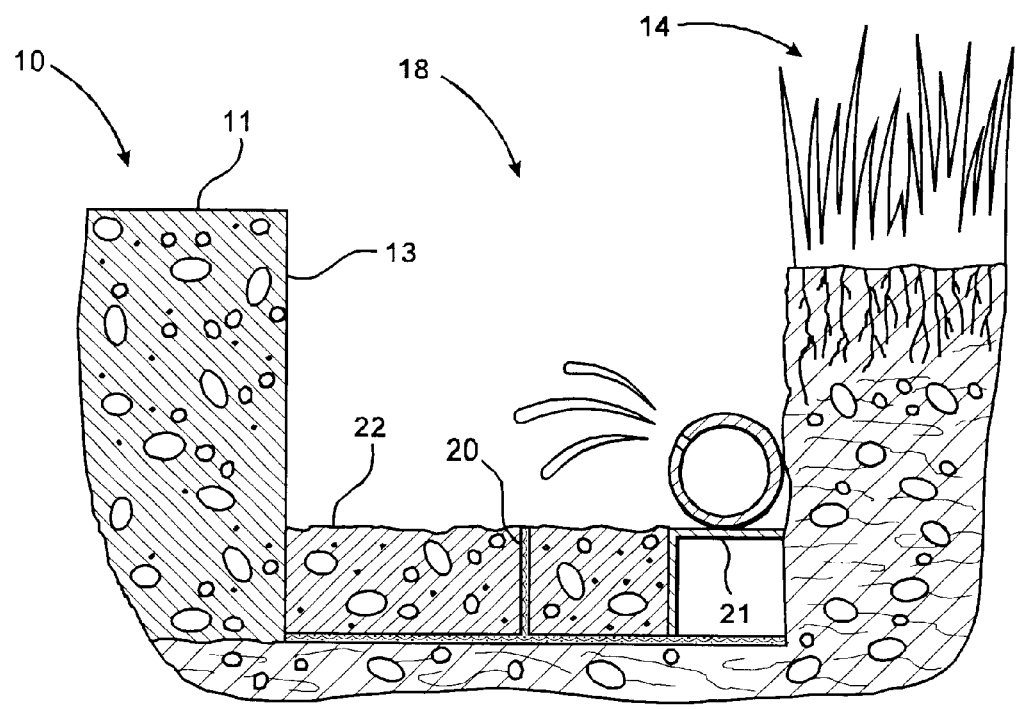
FIG. 2 is a cross sectional view of a side edge of the paved sidewalk and of a trench that has been formed adjacent thereto in constructing apparatus of the present invention.

To form and install an apparatus 15 a trench 18 is first plowed after digging the insert hole with the auger alongside the sidewalk as shown in FIG. 2 to expose a subterranean side 13 of the sidewalk. The trench is preferably some four inches deep and five inches wide. An inverted T-shaped length of wire mesh reinforcement 20 is laid on the floor of the trench. Here it is shown covering the full width of the floor although that is not at all necessary. An inverted L-shaped cardboard or plastic form 21 is placed on top of the reenforcement against the trench side. Dry concrete mix is then poured into the trench over the reinforcement 20 to the level of the top of the form 21. With a water hose with side orifices laid atop the form 21, the mix is wetted to form a reinforced foundation 22. The hose is then removed from the trench and laid alongside of it and the foundation allowed to dry and harden by hydration, hydrolysis reactions.

Figure 4:
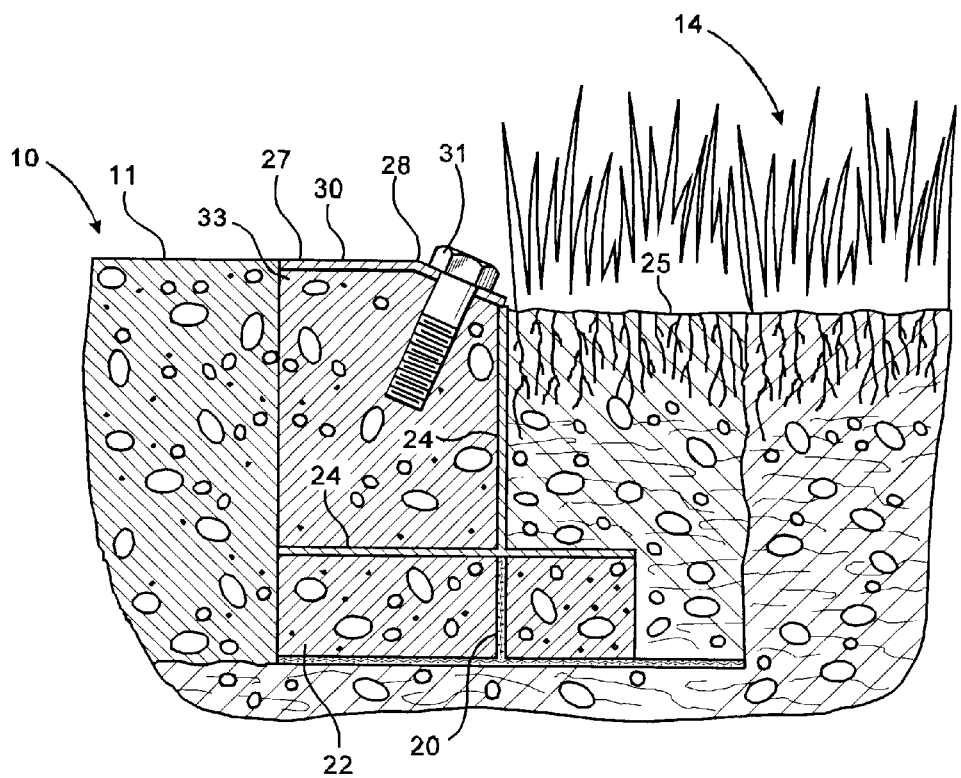
FIG. 4 is a cross sectional view of the side edge of the pavement and filled trench shown in FIG. 2 following completion of the formation and installation of the apparatus.

With reference next to FIG. 4, after the foundation 22 is formed an inverted, T-shaped form 24 is placed upon it. A length of sod 25 is laid in the trench to the side of the form 24 distant of the pavement 10. This sod can either breach or bend down the form 21 or the form removed. Dry concrete mix is again poured into the trench to the other side of the form 24 that is proximal to the pavement 11 and wetted by the hose to become a slurry. The top of the slurry is then formed as with use of a board or trowel if the machine did not make a flat surface to have a top that has a flat portion 27 and a sloping portion 28 that slopes down and away from the top surface 11 of the sidewalk.

Before the slurry dries significantly a plastic strip 30 is laid atop it. The strip is angular and has a series or array of holes along its canted or sloping side that covers the sloping side of the slurry. The shanks of anchor bolts 31 are then passed through the holes and embedded in the slurry with the bolt heads brought flush atop the plastic strip. The slurry is then allowed to dry beneath the plastic strip to form a slab 33.

The plastic strip is preferably green or black. Its top surface is also preferably coplanar or a few millimeters below it with the surface 11 of the pavement. The result is the appearance of a well defined, lined sidewalk or other pavement. Grass does not encroach upon it since it is well spaced from the side edge of the sidewalk. Being slick, the plastic strip is less likely to support small clogs or earth in which grass seeds may grow spottedly as sometimes occurs in the cracks and crevices of concrete. Mud or rain wash is also less likely to flow up the inclined slope of the slick plastic.

It thus is seen that an apparatus and method of forming and installing the apparatus is now provided that overcomes problems commonly associated with prior methods and devices for inhibiting grass from encroaching onto the surfaces of pavements. Although the invention has been described and illustrated in its preferred form, it should be understood that many modifications, changes or additions may be made thereto without departure from the spirit and scope of the invention as set forth in the following claims.

What is claimed is:

1. Apparatus for inhibiting grass from overgrowing the side edge of pavement which comprises a length of concrete laid along the side of the pavement that has a top surface at least a portion of which slopes downwardly away from the pavement, a strip of plastic overlaying said length of concrete, and fastening means for fastening said strip of plastic to said length of concrete.

2. The apparatus of claim 1 wherein said length of concrete top surface has a portion adjacent the pavement that is substantially coplanar with the pavement top surface.

3. The apparatus of claim 2 wherein said strip of plastic overlays both said coplanar portions and said sloping portion of said length of concrete top surface.

4. The apparatus of claim 1 wherein said fastening means comprises a plurality of anchor bolts.

5. A method of forming and installing apparatus for inhibiting grass from overgrowing the side edge of pavement which comprises the steps of digging a trench along the pavement side edge, at least partially filling the trench with a concrete slurry, shaping the concrete slurry with a top surface that slopes down and away from the top surface of the pavement, overlaying the shaped concrete slurry with a plastic strip having an array of holes, securing the plastic strip to the concrete slurry with anchor bolts passes through the strip holes and into the concrete slurry, and allowing the concrete slurry to dry and harden beneath the plastic strip.

6. The method of claim 5 wherein the concrete slurry is shaped with a top surface that extends generally flat from the pavement and then slopes down and away from the top surface of the pavement.

7. The method of claim 5 wherein a portion of the trench is filled with sod.

8. A method of forming and installing apparatus for inhibiting grass from overgrowing the side edge of pavement which comprises the steps of digging a trench along the pavement side edge, placing a strip of wire mesh on the bottom of the trench, forming a concrete foundation over the strip of wire mesh, placing a form with an upright member upon, the concrete foundation, filling the trench to the side of the form distal the pavement with sod, filling the trench to the side of the form proximal to the pavement with a concrete slurry overlaid upon the foundation, shaping the top of the slurry to have at least a portion which slopes down and away from the top surface of the pavement, and permitting the concrete slurry to dry and harden beneath the plastic strip.

9. The method of claim 8 wherein prior to drying and hardening the concrete slurry is overlaid with a strip of plastic and secured thereto.

10. The method of claim 9 wherein the concrete slurry is overlaid with a strip of plastic having holes and wherein the strip of slurry is secured to the concrete slurry with anchor bolts passed through the strip of plastic and embedded in the concrete slurry.

\* \* \* \* \*